July 20, 1948.  M. W. SIMS  2,445,587
ELECTRIC TERMINAL AND COIL
Filed May 10, 1945
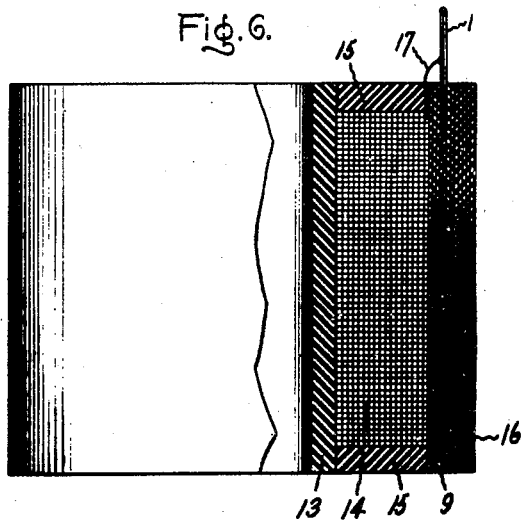
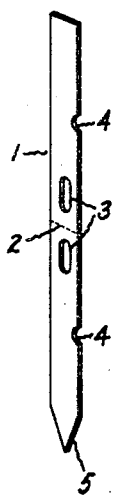
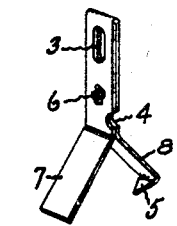
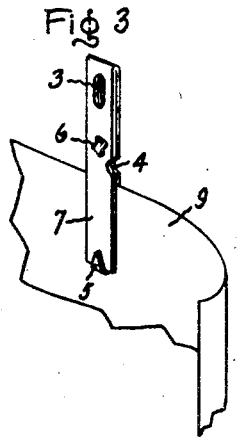
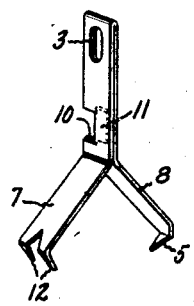
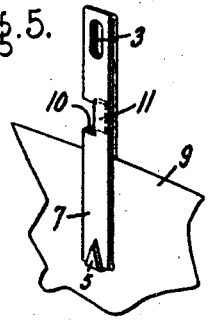
Inventor:
Marion W. Sims,
by *Harry E. Dunham*
His Attorney.

Patented July 20, 1948

2,445,587

UNITED STATES PATENT OFFICE 2,445,587

ELECTRIC TERMINAL AND COIL

Marion W. Sims, Fort Wayne, Ind., assignor to General Electric Company, a corporation of New York Application May 10, 1945, Serial No. 592,948

3 Claims. (Cl. 175—21)

1

This invention relates to electric terminals and more particularly to improvements in terminals for electrical coils.

As the size of the wire forming an electrical coil decreases, its mechanical strength decreases so that it becomes more and more important to provide the coil with a terminal which has substantially more mechanical strength than the wire and which also has greater heat storage capacity than the wire so that soldered connections can be made without danger of burning the fine wire away. Such terminals are usually fastened in one way or another to the coil insulation so that in effect they constitute a strain relief connection for the coil wire. However, they are usually relatively bulky and cause relatively great separation between layers or parts of the coil insulation when they are inserted therein, with the result that when the coil is impregnated with varnish or other hardenable insulating material cracks develop in the hardened varnish in the spaces or separations produced by the terminals.

In accordance with this invention there is provided a novel and simple terminal which is adapted to be embedded in and anchored to the coil insulation and which produces minimum separation or spaces in the insulation. This is accomplished by providing the terminal with a pair of legs which are substantially thinner than the main body of the terminal and which legs straddle an edge of one or more layers of insulation so that the maximum spreading of adjacent layers of insulation by the terminal is less than the thickness of the main body of the terminal.

An object of the invention is to provide a new and improved electrical terminal.

Another object of the invention is to provide an improved electric terminal for varnish impregnated coils of fine wire.

A further object of the invention is to provide an electrical terminal which is adapted to be inserted in and anchored to the insulation of a coil of wire and which produces minimum spreading of the insulation.

The invention will be better understood from the following description taken in connection with the accompanying drawing and its scope will be pointed out in the appended claims.

In the drawing, Fig. 1 illustrates how one form of my terminal may be stamped out of a strip of metal, such as copper; Fig. 2 shows how the strip shown in Fig. 1 is bent to form a terminal; Fig. 3 shows the terminal of Fig. 2 applied to a sheet of insulating material which is adapted to be wrapped around the coil of wire or inserted between layers of the coil of wire; Fig. 4 illustrates a modified terminal construction; Fig. 5 illustrates the terminal construction of Fig. 4 applied to a layer of insulation; and Fig. 6 is a partial cross sectional view of an insulated coil of wire provided with my improved terminal.

Referring now to the drawing and more particularly to Fig. 1, there is shown therein a straight thin strip 1 of conducting material, such as copper. This is adapted to be bent double on itself along the line 2. It is provided with duplicate openings 3 equally spaced from the line 2 which are for the purpose of receiving an external wire connection which may be inserted in these openings and soldered therein. Strip 1 is also provided with duplicate notches 4 which are equally spaced from the line 2 and which are for the purpose of receiving a terminal or a tap from the coil of wire with which my terminal is to be associated. One end of the strip is also brought to a point 5 and this end is longer than the opposite end. In Fig. 2 the strip has been bent double on itself along the line 2 so as to bring the two parts of the strip between the bend 2 and the registering notches 4 into contact and these are then held firmly together in any suitable manner, such as by a spot weld 6, so as to constitute a main body for the terminal which extends roughly between the spot weld 6 and the bend at the line 2. The lower or outer ends of the strip are bent apart to form legs 7 and 8 and the point 5 has been bent inwardly.

Fig. 3 shows how the terminal shown in Fig. 2 is attached to a layer 9 of insulation for a coil. Preferably, this operation is performed before the layer of insulation is applied to the coil. The insulating layer may be of any suitable material, such as paper or fiber glass. As shown in Fig. 3, the terminal is slipped over the edge of the layer 9 with its legs straddling the layer and the legs are then brought together, thus causing the point 5 to pass through the layer 9. The tip of the point 5 may then be bent up over the end of the leg 7 so as to hold the legs in clamping relation with respect to the sheet 9.

In Fig. 4 the bent strip is held together at the middle by providing an enlarged notch 10 in the leg 8 and cutting roughly half way across the leg 7 to form a clip 11 which is bent inwardly through the notch 10 and around back of the leg 8. In addition, the lower end of the leg 7 has been notched out so as to form two points 12 which are bent inwardly toward the single point 5 on the leg 8.

Fig. 5 shows the terminal which is illustrated in Fig. 4 applied to the sheet of insulating material 9 and it will be seen that in this case the point 5 which passes through the layer 9 when bent up lies in the notch between the points 12 on the leg 7 and, similarly, when the points 12 are bent up on the other side of the sheet they lie on each side of the pointed end of the leg 8 so that the effective thickness of the terminal is not increased.

In Fig. 6 there is shown a completed coil which consists of a cylinder 13 of insulating material on which is wound a multi-layer coil of wire 14. Washerlike pieces of insulating material 15 are slipped over the ends of the cylinder 13 and adjacent the edges of the coil. Layer insulation is then wrapped around the outside of the coil, this insulation for example consisting of a number of turns of the sheet 9. Additional insulation, such as an outer wrapper of a number of layers of paper 16 may then be applied.

The entire coil is then varnish-treated in any suitable manner, such as by first vacuum treating it and then submerging it in liquid varnish under pressure so as to cause the varnish to permeate all the spaces between the wire and between the surfaces of the insulation. The coil is then removed and the insulating varnish is hardened in any suitable manner. A terminal 1 is shown clamped to one layer 9 of insulation and a wire 17 from the coil 14 is brought out and attached to this terminal in any suitable manner.

It will be seen in Fig. 6 that the terminal provides minimum spreading of the layers of insulation, especially at the outer surface thereof.

While there have been shown and described particular embodiments of this invention, it will be obvious to those skilled in the art that various changes and modifications can be made therein without departing from the invention and therefore it is aimed in the appended claims to cover all such changes and modifications as fall within the true spirit and scope of the invention.

What I claim as new and desire to secure by Letters Patent of the United States is:

1. The combination, with an electrical coil of wire which is provided with layers of insulating material and impregnated by insulating varnish, of an electrical terminal for said coil including a main body and two flat separated legs which straddle a continuous edge of at least one intermediate layer of insulating material, said legs being substantially thinner than said main body whereby the maximum separation of adjacent layers of insulating material which is produced by said terminal is substantially less than the thickness of the main body of said terminal.

2. The combination as in claim 1 in which at least one of said legs has a laterally extending pointed projection which is embedded into one of said layers of insulating material so as to anchor said terminal in place.

3. In combination, an electrical coil of wire having a plurality of layers of insulation, a thin flat relatively long and narrow metal strip bent double transversely on itself, means intermediate the ends of said bent strip for fastening it together so as to form a main body between the bend and the fastening means and to form two spreadable legs between the fastening means and the end opposite the bend, said legs straddling an intermediate layer of insulation of said coil whereby the maximum spreading of adjacent layers of the coil insulation is one-half the thickness of said terminal, the end of at least one of said legs having a pointed inwardly extending projection which passes through said layer of insulation to anchor said terminal in place, means on said terminal for receiving one terminal of the coil wire, and means on said terminal for receiving an external wire connection for said coil.

MARION W. SIMS.

REFERENCES CITED

The following references are of record in the file of this patent:

UNITED STATES PATENTS

| Number | Name | Date |
| --- | --- | --- |
| 1,455,199 | Groten | May 15, 1923 |
| 1,764,227 | Robinson | June 17, 1930 |
| 1,968,600 | Driftmeyer | July 31, 1934 |
| 2,072,635 | Helgason | Mar. 2, 1937 |
| 2,150,388 | Martindell | Mar. 14, 1939 |
| 2,184,272 | Driftmeyer | Dec. 26, 1939 |
| 2,184,342 | Grupe | Dec. 26, 1939 |
| 2,301,288 | Knauf | Nov. 10, 1942 |

FOREIGN PATENTS

| Number | Country | Date |
| --- | --- | --- |
| 189,641 | Great Britain | 1922 |